United States Patent [19]
Schlickeiser et al.

[11] 3,864,669
[45] Feb. 4, 1975

[54] CORRECTION ARRANGEMENT FOR ELECTRONIC TYPEWRITERS

[75] Inventors: Klaus Schlickeiser, Boll/Hech; Hartmut Linke, Hechingen, both of Germany

[73] Assignee: Walter Buhmann Elektro-Apparatebau GmbH, Stetten bei Hechingen, Germany

[22] Filed: Sept. 11, 1972

[21] Appl. No.: 288,000

[30] Foreign Application Priority Data

Sept. 10, 1971 Germany .......... 2145287

[52] U.S. Cl. .......... 340/172.5
[51] Int. Cl. .......... G11c 19/00, B41j 5/00
[58] Field of Search .......... 340/172.5, 324; 235/60.12; 178/4, 23; 197/19

[56] References Cited

UNITED STATES PATENTS

| | | | |
|---|---|---|---|
| 3,267,435 | 8/1966 | Propster, Jr. | 340/172.5 |
| 3,274,566 | 9/1966 | McGrogan, Jr. | 340/173 |
| 3,351,917 | 11/1967 | Shimabukuro | 340/172.5 |
| 3,388,383 | 6/1968 | Shivdasani et al. | 340/172.5 |
| 3,501,746 | 3/1970 | Vosbury | 340/172.5 |
| 3,540,004 | 11/1970 | Hansen | 340/172.5 |
| 3,544,975 | 12/1970 | Hunter | 340/172.5 |

*Primary Examiner*—Gareth D. Shaw
*Assistant Examiner*—Paul R. Woods
*Attorney, Agent, or Firm*—Michael S. Striker

[57] ABSTRACT

The alpha-numeric symbols and function signals required for the final automatic typing in an electronic typewriter are stored as code words in a plurality of circulating shift registers, one for each binary place of the code word. When a symbol (code word) is to be inserted into or deleted from the stored sequence of code words, the number of stages of each shift register is temporarily, respectively, increased or decreased by one stage. For an insertion, the proper instant at which to enter the code word to be inserted is determined by a comparator output. The comparator input compares the count on a register counter counting the synchronizing pulses shifting the information through the shift registers to the count on an address counter. The count on the address counter signifies the position on the paper being typed upon at which the insertion is to be made.

15 Claims, 6 Drawing Figures

INSERT

| | 1 | 2 | 3 | 4 | 5 | 6 | 7 | 8 |
|---|---|---|---|---|---|---|---|---|
| 1 | a | b | c | d | · | · | · | |
| 2 | · | a | b | c | d | · | · | |
| 3 | · | · | a | b | c | d | · | |
| 4 | · | · | · | a | b | c | d | |
| 5 | d | · | · | · | a | b | c | |
| 6 | c | d | · | · | · | a | b | |
| 7 | (z) | c | d | · | · | · | a | b |
| 8 | b | z | c | d | · | · | · | a |
| 9 | a | b | z | c | d | · | · | |

DELETE

| | 1 | 2 | 3 | 4 | 5 | 6 | 7 | 8 |
|---|---|---|---|---|---|---|---|---|
| 1 | a | b | c | d | · | · | · | |
| 2 | · | a | b | c | d | · | · | · |
| 3 | · | · | a | b | c | d | · | · |
| 4 | · | · | · | a | b | c | d | · |
| 5 | · | · | · | · | a | b | c | d |
| 6 | d | · | · | · | · | a | b | (c) |
| 7 | b | d | · | · | · | · | a | |
| 8 | a | b | d | · | · | · | · | |

CORRECTION ARRANGEMENT FOR ELECTRONIC TYPEWRITERS

BACKGROUND OF THE INVENTION

This invention relates to a correction arrangement for electronic typewriters and similar machines. In particular it relates to such typewriters which have a storage unit in which the text to be typed out is stored in the form of code words signifying both alpha-numeric characters and function controls. These code words are entered into said storage arrangement by means, of for example, keyboard activation. Corrections can then be made in the stored text by means of exchanges of symbols, deletion, and insertion of symbols, the corrected text then being typed out automatically under control of the typewriter only.

Electronically controlled typewriters were developed in order to minimize the necessity for erasure or complete retyping of text upon occurrence of typing errors or to accommodate corrections to the text such as insertions or deletions. These machines are generally operated in such a way that the text is first typed in draft form, this form then being stored in the storage means. Subsequent corrections then are also entered into the storage means and may for example replace portions of the original text. In such a way an error-free, final text is finally stored and this final text is typed out strictly under control of the machine and therefore at a speed limited only by the operating speed of the machine.

In known machines of the above described type, corrections can generally be carried out fairly readily as long as the total number of symbols on a page remains unchanged. However, the known machines require very complicated arrangements in order to overcome the problems developing from the insertion or the deletion of portions of the text.

For this reason, known electronic typewriters of the above described type which generally operate with punched tapes or magnetic tapes as storages in general require two separate storage means. These cooperate in such a way that those portions of the text wherein the number of symbols is not to be changed are transferred from the first memory in which the text was originally stored to a second memory. If a text portion is to be inserted, this transfer is interrupted and the new text stored in the second storage. In parts of the original text are to be deleted the particular part is not transferred from the first to the second memory. In this fashion the second memory finally has the corrected text and then controls the typing out process.

This type of machine requires a relatively high amount of electronic and mechanical equipment. This increases the cost of the equipment and also increases the maintenance requirements. Further, they are not very simple to operate and therefore require particularly trained typists for proper operation.

SUMMARY OF THE INVENTION

It is the object of the present invention to furnish a correction system for electronic typewriters and similar machines which requires relatively little equipment, is reliable and is further simple to maintain and operate.

The present invention operates in a system for furnishing a visual output corresponding to selected ones of a plurality of alpha-numerical inputs, each represented by a code word having a predetermined number of places. It is a correction system for inserting into, or deleting from said visual output a determined one of said alpha-numeric inputs and comprises memory means for storing said code words, said memory means having a plurality of synchronously operating circulating storage means, one for each of said places, each having a determined plurality of storage locations. The correction system further comprises memory control means for temporarily changing the number of said storage locations in said storage means during the insertion or deletion of said determined one of said alpha-numeric inputs. It further comprises output control means for furnishing said visual output in correspondence to the so-stored sequence of code words representing said alpha-numeric inputs.

In a preferred embodiment of the present invention, each of the storage means comprises a shift register. All the shift registers are synchronously operated under the control of synchronizing signals. Although the number of stages in each shift register must be at least equal to the number of possible spaces on a page, such shift registers can be manufactured to occupy very little space by use of field effect transistors or integrated circuit techniques. The cost of such an arrangement is also less than the cost of similar arrangement using mechanical parts which, also, require more maintenance. The shift frequency for such shift registers is approximately 4 to 5 MHz, so that a shift register of for example 4,096 stages each code word is available at the register input approximately every millisecond.

In a preferred embodiment of the present invention, the particular code word out of the above described code word sequence which is to be printed or written out, is selected by use of a comparator. The comparator compares the count on a register counter operated in synchronism with a shift register to the count on an address register which is advanced in correspondence to the particular machine operation, and furnishes a comparator output signal when the two counting signals coincide.

In a further preferred embodiment of the present invention, the shift register stages comprise a first stage, a last stage, a next to the last stage and a third last stage immediately preceeding said next to the last stage. First circuit means connect the output of the next to the last stage to the input of the first stage under normal operating conditions, while second circuit means connect the output of said last stage to the input of said first stage during the insertion of one of said alpha-numeric inputs. Third circuit means connect the output of the third last stage to the input of said first stage during the deletion of one of said alpha-numeric inputs from the visual output. The change in shift register stages in this particular embodiment is maintained until completion of the operating cycle having the deletion or insertion. Specifically, the memory control means may comprise an OR gate connected to input/output control means which are in turn connected to the input of the shift registers. The inputs to the OR gate are the outputs of first, second and third AND gates and connected respectively, to the next to the last, last, and third last register stages. The first second and third AND gates further have function control inputs respectively connected to receive function control signals signifying "write," "insert" and "delete." The circuitry described so far insures that the correct register stage output is connected to the input during the particular type of operation, as described above. The timing to reconnect the next to the last register stage to the register input at the end of the cycle is then accomplished by a blocking circuit which resets upon receipt of a "0" count on the register counter. The output of the blocking means is connected to the above-described three AND gates at respective third inputs. In a second embodiment of the present invention the memory control means operate in such a fashion that the next to the last register stage is connected to the register input under normal operation, while doing the insertion process the last register stage is connected to the register input starting with the comparator output signal signifying the location at which the new symbol is to be inserted until the end of that particular operating cycle, while during a deletion the same connection is made from the beginning of a complete operating cycle until the generation of the comparator output signal. In this particular embodiment, the last two register stages each have an AND gate connected thereto, the outputs of the AND gates being connected through an OR gate with the input/output control means of the shift register. Each of the two AND gates has a first input connected to the output of the respective register stage. The second input of the AND gate connected with the next to the last stage receives the function control signal signifying "write," while the second input of the AND gate associated with the last register stage receives either the "insert" or "delete" function control signals. The third input of the last stage is directly connected with the "1" output of two blocking circuits while the next to the last stage is connected through an inverter with these inputs. The first blocking circuit is set in response to the comparator output signal and reset through the "0" signal of the register counter, while the second blocking circuit of this embodiment is set by joint occurrence of the "delete" signal and the "0" signal from the register counter, and reset by the comparator output signal.

In a preferred embodiment of the present invention, a numerical indication indicating the number of still empty therefore available storage locations in the shift register memory is provided.

In a further preferrred embodiment of the present invention the contents of the shift registers, that is the text which is to be printed out, may be transferred into other storage means, if necessary, at a reduced synchronizing frequency.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
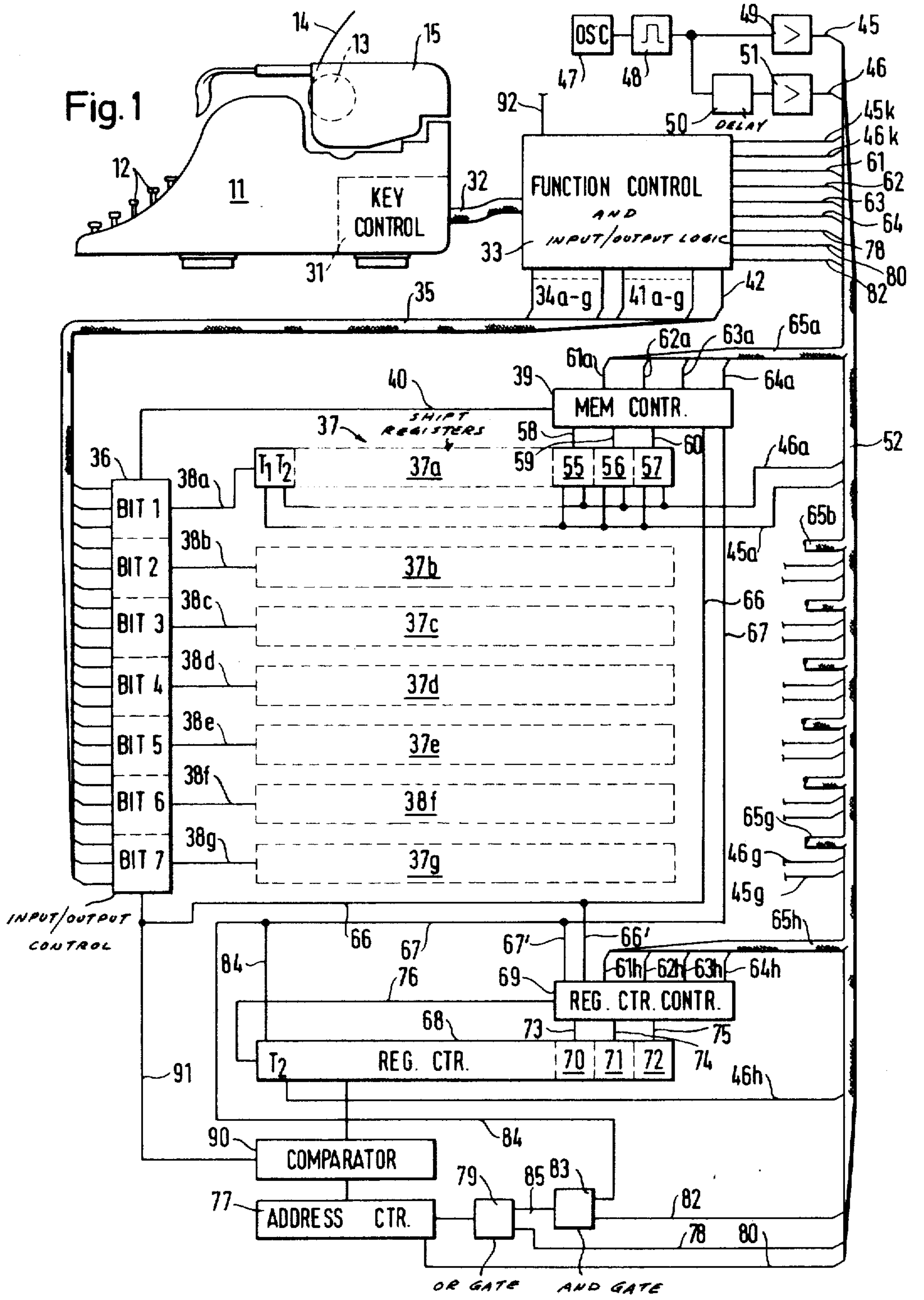
FIG. 1 shows a typewriter with the correction arrangement in accordance with the present invention in schematic form.

A preferred embodiment of the present invention will now be described with reference to the drawing.

Figure 2:
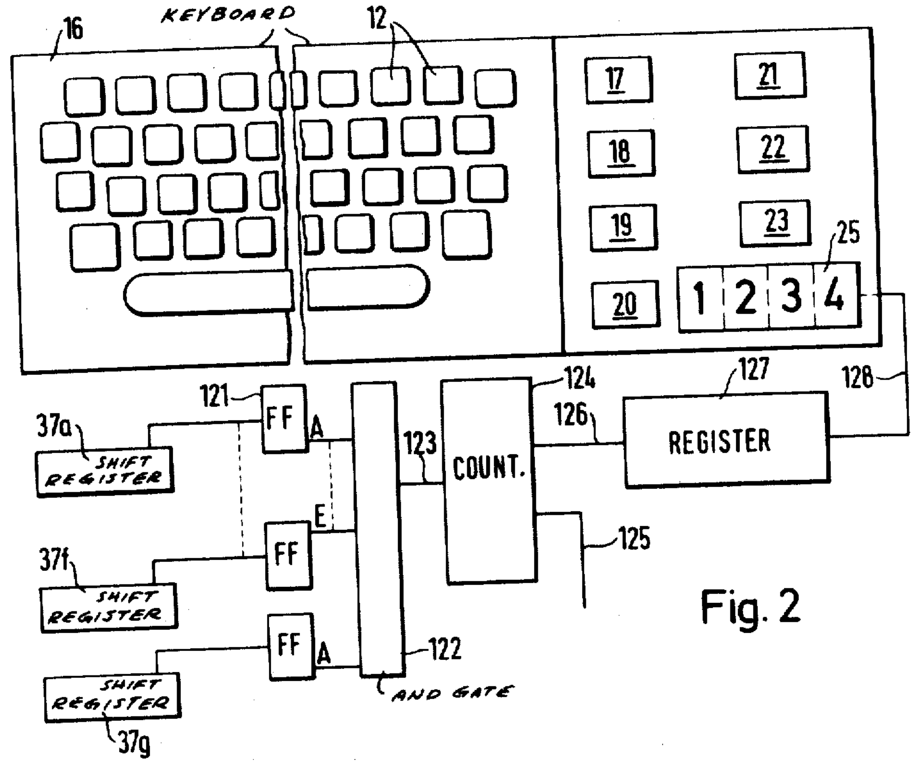
FIG. 2 is a block diagram showing the key field of the typewriter and the indicator arrangement for indicating empty storage locations.

The system for furnishing a visual output corresponding to selected ones of a plurality of alpha-numeric inputs which is the background in which the present invention resides, comprises a typewriter 11, shown in FIG. 1 and having a keyboard including keys 12. The typewriter shown here is a conventional typewriter such as typewriter IBM, model 731, a "selectric input-/output" model where depression of one of the keys 12 results in the entering of a alpha-numeric symbol onto a sheet of paper 14 which is advanced by means of a roller 13. Of course depression of one of the keys 12 may also initiate a particular machine function, for instance the advance of the sheet of paper by one line as accomplished by the turning of roller 13 or a movement of the carriage 15. Keys 12 thus include both functional and input keys, that is keys furnishing alpha-numeric symbols. These keys are arranged within a key field 16 (FIG. 2). Besides the above described alpha-numeric and functional keys 12, additional keys are present to initiate certain correction operations as follows: a start key 17; an insert key 18; a delete key 19; a symbol exchange key 20; the "jump" key 21; a "write" key 22, and an erase key 23. The carrying out of the functions initiated through activation of these keys will be discussed in detail below.

Electrically controlled indicator means 25 are also arranged within the key field 16. These indicator means indicate the number of storage locations which are still available, i.e., empty. The functioning of this indicator means will also be discussed below.

Typewriter 11 further comprises a key contact arrangement 31 having key operated contacts which, in accordance with a predetermined code, close in response to the activation of a symbol or a function key to form a code word corresponding to said alpha-numeric symbol or function. The arrangement 31 may comprise any conventional arrangements of mechanically, magnetically, or optically operated contacts. A preferred embodiment of key control arrangement 31 may be found in IBM form No. 543-0033 or the instruction book for the above typewriter on pages 8–9.

The coding of the individual alpha-numeric symbols and of the machine functions is effected in the present embodiment in a binary code having seven bits for each code word. Thus, under use of a dual code, 128 code words each having 7 bit places are available. This number is sufficiently high to allow coding of the 100 different symbols required for typewriter operation.

The key control arrangement 31 is connected to a function control arrangement 33 via line 32. The function control arrangement 33 comprises the required bistable circuit elements and pulse formers which are needed to represent the individual bits of a code word at seven outputs 34 *a–g*, and a preferred embodiment thereof can also be found in the above-identified IBM publication (see FIG. 7, page 16, where lines 34 *a–g* are the lines shown in FIG. 7 as the outputs of seven flip-flops.

In accordance with the present invention, the above described typewriter cooperates with memory means, which comprise seven synchronously operated shift registers 37 *a–g*, one for each bit place of the code word. Outputs 34 *a–g* of control arrangement 33 are connected via lines 35 with input/output arrangements 36 associated with shift registers 37. These input/output control means comprise seven identical stages each associated with one of the shift registers 37 *a–g*. The signals on line 34 *a–g* can thus be entered into shift register 37 under control of the input/output control means 36.

The system of the present invention further comprises memory control means 39 for transferring shift register output signals to the input/output control arrangement 36 via a line 40 and for transferring said register output signals to inputs 41 *a–g* of function control arrangement 33 via further lines 35. A more detailed description of memory control means 39 will be given with reference to FIG. 3, where these circuits are broken down into standard inverters, AND-gates, OR-gates and flip-flops, all commercially available as units. Function control arrangement 33 further comprises circuit means which convert the so received signals which comprise code words into pulses for the selective activation of the type bars or a machine function corresponding to the bit combination of the particular code word. The bits constituting a code word are received in parallel.

The control arrangement 33 further has an output line 42 which furnishes erase signals to the individual stages of the input/output control arrangement 46 through another one of lines 35.

The memory means of the present invention comprises seven shift registers 34 *a* – 37 *g*, which may utilize field effect transistors or be built in accordance with integrated circuit techniques. Shift registers TMC 3412 JC manufactured by Texas Instruments, Inc. and others are suitable for this purpose. The shift registers advanced through synchronizing pulses T1 and T2 which are applied to the individual register stages via lines 45*a* – *g* and 47 *a* – *g*, respectively. An oscillator 47 is provided to generate the synchronizing pulses. The output of oscillator 47 is followed by a pulse former 48 which forms the synchronizing pulses and is further followed by an amplifier 49 which furnishes the first sequence of synchronizing pulses T1 to line 45 and furnishes a second sequence of synchronizing pulses via a delay 50 and a further amplifier 51 to a line 46. Lines 45 and 46 form part of a cable 52 through which the synchronizing pulses are applied to the individual registers and to other control circuitry (lines 46*h*, 45*k*, 46*k*).

Shift registers 37*a* – *g* are dynamic circulating registers in which information once entered is continually circulated under control of synchronizing pulses T1 and T2. In order to achieve this circulation, the outputs of the shift registers are connected via input/output control means 36 (also described in detail below with reference to FIG. 3) to the inputs 38 *a* – *g* of good registers. Shift registers 37 have a variable number of stages, namely the stages of said shift registers may be selectively increased or decreased as required. For example, in one embodiment of the present invention, the last three stages of shift registers 37 *a–g*, are designated 55, 56, and 57, respectively. Outputs 58, 59 and 60 of these register stages are connected with memory control means 39 which in turn furnish an output signal via line 40 to input/output control means 36. The memory control means 39 are controlled by function control signals which will be described in detail below and are furnished via line 61 a 64 a from function control arrangement 33 via a cable 52 and 65*a*. Further, signals controlling memory control means 39 are furnished via line 36 and 37.

The shifting of code words through register 37 is monitored by first counting means, namely a register counter 68 (such as counters SN54160) which counts synchronizing signals T2 furnished on a line 46*h*. Register counter 68 must have the same number of stages as each of the shift registers 37. As is the case with shift registers 37, the total number of stages in said shift register and therefore in said register counter may be selectively increased or decreased as will be described in detail below. To effect this increase or decrease of the number of spaces of the register counter 68, a register counter control arrangement 69 is furnished. This in turn is controlled by signals furnished by control stage 33 through lines 52 and 65*h* and the lines associated 61*h*, 62*h*, 63*h* and 64*h*. The register counter control arrangement 69 is connected to the last three stages of register counter 68 via line 73, 74 and 75 and furnishes the register counter output signal via a line 76 to the register counter input.

In the present invention, the display means denote, for example, the sheet of paper 14, shown in FIG. 1. The display means have a plurality of display locations, each of these display locations being a particular location on the sheet of paper. Each of these storage locations in the memory means, that is each stage in the shift registers 37 corresponds to one of these display locations. An address counter is provided to allow the correspondence between a particular shift register stage and the corresponding storage location to be established. The address counter has reference numeral 77 and under normal operating conditions is advanced by one count for each pulse on a line 78 which is furnished by control arrangement 33 via line 52 to the input of an OR gate 79 for each step that the typewriter carriage is advanced. Further, address counter 77 is subjected to a backward count for each pulse on line 80 which is connected to the reset input of said adjust counter. Each pulse on line 80 is furnished by the control arrangement 33 via line 52 for each back spacing of the carriage. Further, forward pulses are furnished to address counter 77 during the "jump" process which will be described in greater detail below. These pulses are furnished via line 82 which connects the output of control arrangement 33 via line 52 to the input of an AND gate 83. The second input of AND gate 83 receives a signal via line 84 when register counter 68 is in the zero position, that it when it furnishes a "0" count signal. Output 85 of AND gate 83 is connected to the second input of the above described OR gate 79, whose output is connected to the address counter input.

A comparator 90 compares the count on register counter 68 and address counter 77. Comparator 90 furnishes a comparator output signal when the count on these two counters coincide. Thus, when a comparator output signal is furnished, the information which corresponds to the position on the piece of paper represented by the count on the address counter is present at the input of shift register 37 and can thus be subjected to a change. The comparator output signal is applied via line 91 to input/output control 36 of input register 37 and is further furnished to memory control means 39 via line 66 and to the register counter control means 69 via line 66'. Control stages 39 and 69 further receive the "0" output signal of register counter 68 via line 67 and 67', respectively.

The operation of the machine is described in detail with respect to each of the machine functions below. However, in general the operation of the machine proceeds first inserting a sheet of paper into the machine and typing thereon a draft of the desired text. The sheet of paper is then removed and corrections are carried out on a second sheet of paper, the address counter being activated via the correct function control keys to cause the changes in the text to be entered into the proper positions in the memory locations. The corrections may contain a single symbol or a whole new section of text. The corrections are thus entered automatically into the shift register, so that after all corrections have been completed the final text is stored completely in shift registers 37. Function keys provided for this purpose include a word advance key wherein the address counter is advanced until the end of the subsequent word, i.e., until a code word signifying a space appears at the corresponding count of the shift register. Further function keys are a line advance key which advances the address counter to the beginning of the next line of text and a paragraph advance key which causes the address counter to be advanced to an address corresponding to the start of the next subsequent paragraph. This type of control and advance does not form a part of the present invention except as required to reach the position whereat the correction is to be carried out. The present invention concerns itself with the manner of carrying out the correction by the changing of the number of stages in the shift register. In any case, after completion of the corrections, the error-free text is completely stored in shift register 37.

A clean sheet of paper is then inserted and the activation of "write" key 22 causes the machine to type the desired text without error and at a high speed which is determined only by the mechanical construction of the machine. Of course the text in shift registers 37 may be typed out more than once, if it is so desired. It can also be transferred to other type of storage means, for example magnetic tape storages, for permanent storage via output line 92 of control arrangement 43.

The operation of the machine will now be discussed in detail with reference to the various machine functions.

Figure 3:
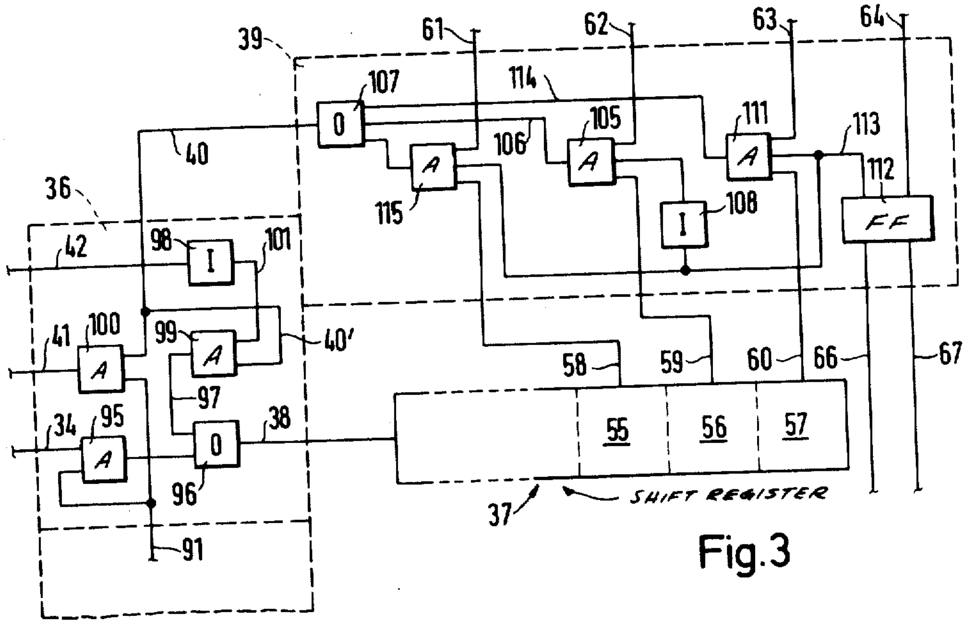
FIG. 3 is a diagram showing the input/output means and the memory control means in block diagram form.

The machine is first started by activation of the "start" key 17 which in turn causes oscillator 47 (FIG. 1) to begin oscillating, in turn causing synchronizing pulses T1 and T2 to be applied to shift register 37 and cause the information therein to be advanced synchronously. Address counter 77 is in its original position. Activation of a key 12 then causes a combination of contacts within key control arrangement 41 to close. Of course the so closed contacts correspond to the coding of the alpha-numeric symbol or the machine function assigned to the activated key. In response, control arrangement 33 furnishes bit-parallel signals on output lines 34 *a–g*. These signals are applied via line 35 to input/output control 36 which comprises seven identical stages, each assigned to a corresponding individual bit place in the code word. These signals are applied via line 34 to a first input of an AND gate 95 (FIG. 3). As soon as the count on register counter 68, which is advanced by synchronizing signals T2 simultaneously with the advance of shift registers 37, reaches a counter corresponding to he count on address counter 77, for example position 1 at the beginning of writing, comparator 90 furnish the comparator output signal via line 91 to the second input of AND gate 95. AND gate 95 becomes conductive and enters the signal on line 34 into shift register 37. At this time no signal appears at the second input of OR gate 96 if it is assumed that no information was previously stored in shift register 37 or that any previously stored information has, as will be described below, been deleted. Simultaneously the address counter is advanced by one step via a pulse on line 78. Of course, if the back space key is activated, address counter 78 is set back by one count via a pulse on line 80.

The so-stored signal is now shifted through shift register 37 under control of synchronizing pulses T1 and T2 in a continuous circulation. It appears at the input of the shift register after a complete operating cycle, that is after a circulation through the complete shift register. The duration of this operating cycle thus depends on the number of stages in the shift register and on the interval between synchronizing pulses. Since the frequency with which signals may be shifted through a shift register constructed with field effect resistors may be in the order of 4 to 5 MHz, and since the shift registers will have 4,096 stages, the memory location corresponding to the next sequential position of the address counter will appear after approximately one millisecond at the register input. This shows that the time between the activation and until the storing of the bit combination comprised in the code word corresponding to said key activation is very low, and may be considered negligible for practical purposes.

WRITING

Activation of write key 22 causes the function control 33 to activate the type bar or to furnish the signal for controlling a particular machine function signified by the code word appearing at input lines 41 and corresponding to the output, furnished in parallel, of the bit signals stored in shift registers 37. As already described when the count on register counter 68 and the count on address counter 77 coincide, comparator 90 furnishes a comparator output signal which is applied via line 91 to input/output control means 36. As shown in FIG. 3 for one particular stage of the seven identical stages comprised in control arrangement 36, this signal is applied to the first input of the AND gate 100 whose second input is connected to the memory control arrangement 39 via line 40 and therethrough receives the signal from the last stage of the corresponding one of shift register 37. The signal on line 40 is also applied via line 40' to one input of an AND gate 99. AND gate 99 is conductive since its second input receives a signal on line 101 from the output of an inverter 98. The input to inverter 98 is the erase signal on line 42, which, in the present case, is assumed to be absent.

The output of AND gate 99 is connected via line 71 to the input of OR gate 96 through which the signals are transmitted via line 38 to the input stage of shift register 37. The information stored in the last stage of shift register 37 in thus transferred to the input of such shift register. The particular bit of decode word is further furnished at the output of AND gate 100 on a line 41 and transmitted to the input of function control means 33. The remaining seven stages of input/output control means 36 similarly transmit the last bit stored in the remaining ones of shift registers 37*a* – *g* to the input of function control 33. Function control 33, in response to the so received code word activates the type bar signified thereby or initiates the corresponding machine function.

ERASURE

Activation of erase key 23 causes the code word stored in shift registers 37*a* – *g* to be erased. Activation of this key causes a signal to appear on line 42, which signal is applied to inverter 98 of input/output control means 36. The output signal of inverter 98 thus disappears and AND gate 99 is blocked, thereby interrupting the flow of information from the last to the first register stage.

JUMP

As mentioned above, the typewriter has a known jump arrangement wherein activation of jump keys 21 causes the address counter to be advanced to a place corresponding to a given code word. As mentioned, for example, a line or a paragraph may be skipped. While the address counter could be advanced or set back for this purpose asynchronously with the register counter, in the preferred embodiment of the present invention the address counter is advanced by one count for each complete cycle of shift register 37. The control for this is effected via the "0" count output 84 of register counter 68 which furnished an input signal to AND gate 83. The second input signal for AND gate 83 is the "jump" signal furnished by function control stage 33. The output of AND gate 83 is furnished via line 85 to OR gate 79 and thus each "0" count signal on register counter 68 effects an additional count on address counter 77.

SYMBOL EXCHANGE

In this type of machine operation, a particular symbol appearing in a particular position in the text supposed to be replaced by another symbol. As previously mentioned the code words stored in shift register 37 are continually circulated at a frequency determined by synchronizing pulses T1 and T2. For this purpose the last stage of the shift register is connected via memory control means 39 and line 40 with input/output control means 36.

Under normal operating conditions, the next to the last stage of the shift registers, namely stage 56 in FIGS. 1 and 2 operates as the last stage. This stage is connected via line 59 with memory control means 39, so that a signal appearing on line 59 will, as shown in FIG. 3, be applied to the first input of AND gate 105. Under normal operating conditions, a signal appears at the second input of this AND gate. This signal is furnished by control means 33 via line 62 and through lines 52 and 65. Thus normally AND gate 105 is conductive and its output signal is applied via line 106 to OR gate 107 whose output signal in turn is transferred via line 40 to input/output control means 36. The third input of AND gate 105 is also active since it is connected to the output of inverter 108 at whose input no signal is present as will be explained later.

Under the above described normal operation, the information appearing at the output of shift register 37 is again entered at its input. If, however, the symbol exchange key 20 is now activated a signal appears on line 42 which causes the signal at the output of inverter 98 to disappear, blocking AND gate 99. The transmission from the last stage to the first stage of register 37 is thus broken and simultaneously, as described above, the signal selected by keyboard activation is entered into the corresponding place in shift register 37 through AND gate 95 and OR gate 96.

INSERTION

In the above described mode of operation, shift registers 37 have a constant number of stages. Specifically, the next to the last stage 56 functions as the last stage throughout. The now to be discussed modes of operation are those in which the number of stages in shift register 37 is changed during operation.

Activation of insert key 18 and a subsequent activation of one of the keys 12 causes the following operations to ensue: Referring to FIG. 3, AND gate 111 first receives a signal from function control stage 33 via line 63. Further, blocking circuit 112 receives a set signal over line 66 as soon as comparator 90 furnishes a comparator output signal following the next key activation. Thus the set or "1" output of blocking circuit 112 furnishes a signal to the second input of AND gate 111, while AND gate 105 is blocked through the lack of an output signal on inverter 108. The blocking of AND gate 105 of course results in the break of the connection between stages 56 and the input or first stage of shift register 37. The code word in stage 56 is, during the next synchronizing interval, shifted into stage 57. Because of the interruption of the signal flow from stage 56 to the input or first stage of register 37, a gap appears in the code word sequence. The code word corresponding to the activated one of keys, 12 is inserted into this gap in the manner described above. In response to the next synchronizing pulse the code word previously present in stage 56 and now present in stage 57 is shifted to the first stage of register 37 through AND gate 111. Specifically, the output of AND gate 111 is transferred through OR gate 107 to the input-/output control means 36 and thereby shifted into the first register stage as described above.

The number of stages of shift register 37 has thus been increased temporarily by one unit and the gap in the code word sequence created by this extension has been filled with an additional code word. The place at which the gap occurred was of course determined by the count on the address register. The connection of stage 57 through AND gate 111 to the input of shift registers is maintained until the register counter (first counting means) 58 again furnishes a "0" signal. At this instant the code words stored in the shift registers are stored sequentially in the lowest shift register stages, the still empty shift register stages with the higher addresses following said filled stages. In response to "0" count signal, furnished on line 67 to blocking circuit 112, this blocking circuit is reset. The reset or "0" output signal of blocking circuit 112 is applied to line 64 to function control circuit 33. Receipt of this signal causes the supression of the signal on line 63 and thus causes the blocking of AND gate 111. Further, the signal at the input of inverter 108 is also removed, causing a signal to be applied to the second input of AND gate 105, reestablishing the transmission from stage 56 to the input/output control means 36.

Shift registers 37*a* – *g* thus again have the original number of stages and a code word has been entered into the desired position in the code word sequence stored therein.

Of course the number of stages in register counter 68 must be increased when the number of stages in shift registers 37 is increased. For this purpose, the register counter control means 69 receive a signal over line 63*h* from function control means 33 and via line 66' from the comparator, so that the stage 72 is added following the previously highest counter stage 71 in register counter 68. In a fashion similar to the fashion discussed in relation to the addition of a stage to shift register 37, the receipt of these control signals causes the counter to advance to stage 72 before restarting in stage 1. The "0" count signal furnished over line 67' to the register counter control means 69 causes stage 75 to be again eliminated from register counter 68 and the original operation of the counter to be resumed.

INDICATION OF AVAILABLE STORAGE SPACE

The insertion of code words signifying either an alpha-numeric symbols of functions can take place only as long as free storage places are still available. In order to give the operator of the typewriter an idea about how many spaces are still available, an indicator means 25 is supplied next to the key field 16. This indicator gives a numerical indication of the empty storage spaces in shift register 37. In connection with this it should be noted that a standard typewriter paper has a capacity of approximately 3,000 symbols. Thus when shift registers having a maximum of 4,096 stages is supplied, a reserve of storage places is always available.

The indicating means 25 and the control means therefor are shown in FIG. 2. As shown in this Figure, each of the registers 37*a* through 37*g* has a bistable circuit 121 connected to the output of a selected stage thereof. The particular stage can be any arbitrarily chosen stage, but of course it must be the corresponding stage in each of the registers. Each of the flip-flops has a "I" or "0" output depending upon the bit stored in the corresponding register stage. A determined code word, such as for example all zeros except a "one" in a predetermined one of the shift registers signifies an empty storage space. Upon the receipt of this code word at the inputs of AND gate 122, this AND gate furnishes an output on line 123 which causes an advance of counter 124, herein referred to as additional counting means. Counter 124 is reset after each operating cycle by means of a signal on line 125. The final count on the counter during each operating cycle is transferred to register 127 and thence is applied to the indicator means 125 which furnish the visual indication of the number of storage spaces still available.

DELETION

The correction arrangement of the present invention can be used to delete code words from the code word sequence stored in the shift registers. This can be accomplished without leaving a gap in said registers which would result in a corresponding gap in the visual output. Reference to FIG. 3 shows that AND gate 115 becomes conductive if a signal appears on lines 61, 58 and 113. A signal is applied on line 61 upon activation of the "delete" key 19. After the address counter 77 has been set to the correct address where the deletion is to take place by the operator, the comparator output signal on line 66 sets the blocking circuit means 112. The "I" output of said blocking circuit furnishes the signal on line 113. Thus any bit signal stored in stage 55 will be transmitted through AND gate 115 and OR gate 107 to the input/output control means 36. Further, AND gate 105 is blocked via inverter 108. Thus the number of stages in shift register 37 has been decreased by one and the code word stored in what is normally the last stage 56 is not transferred to the storage input. Since, in this mode, no additional code word is to be entered into the sequence of code words, no signal appears at input 34 of AND gate 95. The decreased number of stages of shift register 37 obtains until the blocking circuit 112 is again reset via a signal on line 67. This signal on line 67 is of course as previously the "0" count signal from register counter 68. In the absence of a signal on line 114 AND gate 115 is again blocked and AND gate 105 again becomes conductive. Simultaneously, the signal on line 64 is applied to the function control means 53 which in turn discontinue the signal on line 61. Thus the code word stored in stage 55 of the shift registers is no longer transferred to the input, the transfer to said input taking place again from stage 56. No gap is created in the code word sequence, stored in shift registers 37 since the higher storage stages are always empty when the code words are stored in sequence beginning with the first storage stage.

Of course register counter 68 is also decreased by one stage when the number of stages in register 37 is so decreased. In this mode of operation, a signal supplied to the register counter control means via line 66' which carries the comparator output signal. This causes the register counter to be switched from its normally highest stage 71 to the next lower stage 70. The "0" count signal supplied via line 67' then causes the previous circuit conditions to be reestablished that is the counter again counts through stage 71.

ALTERNATE EMBODIMENT

The "delete" and "insert" operations can also be carried out in the following embodiment of this present invention. In this alternate embodiment, the number of stages in the shift register can be increased by one stage, but no decrease of said stages takes place.

Figures 4, 5, 6:
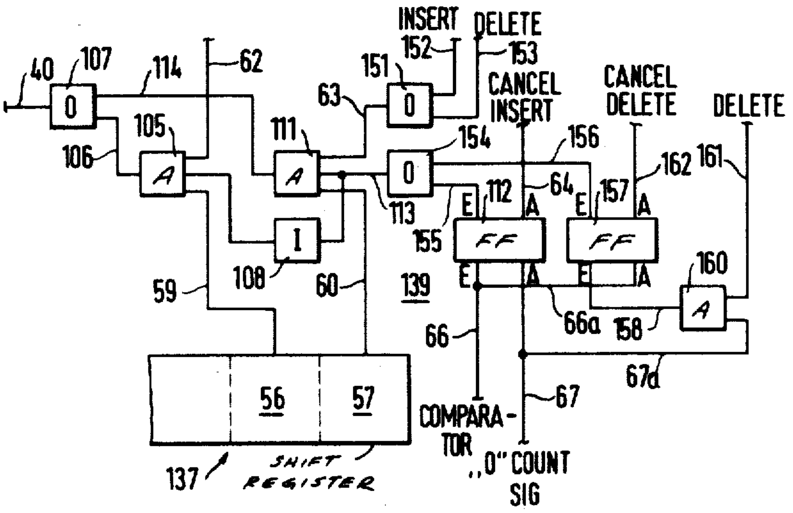
FIG. 4 shows an alternate embodiment of the meory control means in block diagram form.
FIG. 5 is a diagram illustrative of the insertion operation.
FIG. 6 is a diagram illustrating the deletion operation.

Such a shift register is shown in FIG. 4 and denoted by reference numeral 137. The normally last stage of the shift register is again denoted with reference numeral 56 while the actual last stage is denoted with reference numeral 57. Those parts of the circuitry which are unchanged from FIG. 3 have the same reference numbers as in FIG. 3.

It will be noted that in the embodiment of FIG. 4, the memory control means comprise first memory means, namely AND gate 105 and second memory control means namely AND gate 111. The third AND gate of course is not present. It will further be noted that the input line 63 to AND gate 111 is the output of an OR gate 151 whose input lines 152 and 153 carry the "insert" and "delete" function control signals, respectively. The second input of AND gate 111 is the output of an OR gate 154 whose inputs carried on lines 155 and 156, respectively are the set or "I" outputs of a first and second blocking circuit labelled 112 and 157, respectively. Blocking circuit 157 is set by a signal on line 158 which is connected to the output of an AND gate 160. The first input of AND gate 160 is connected to a line 161 which carries the "delete" signal, while the second input is connected to a line 67*a* which carries the "0" count signal from register counter 68. Resetting of blocking circuit 157 takes place in response to the comparator output signal furnished on line 66*a*. The reset output of blocking circuit 157, supplied to a line 162 causes the control circuit 33 to operate to terminate the "delete" signal. The reset output of blocking circuit 112, in similar fashion, causes the cancellation of the "insert" signal furnished by control means 33.

The operation of the circuits will be shown in the following example, with special reference being made to FIGS. 5 and 6.

INSERTION

In this mode of operation a symbol is to be inserted into the sequence stored in the shift registers. In the example shown in FIG. 5, a register having seven stages under normal operation and eigth stage to act as an additional stage is to be used to insert the symbol "*z*" into the sequence of stored symbols *a, b, c*, and *d*. Symbol "*z*" is to be inserted following the symbol *b*.

Activation of the "insert" key causes a signal to be applied to line 63 connected to the input of AND gate 111. The address counter is advanced to the position occupied by the symbol "*b*" on the paper. The key having the symbol "*z*" is depressed. Following the sixth shift, the comparator will furnish a comparator output signal which sets blocking circuit 112. The setting of blocking circuit 112 causes a signal to appear at the output 113 of OR gate 154. This signal, through inverter 108 blocks AND gate 105. The information stored in stage 56 of registers 147 is therefore not transdeferred to the input. At this time, as previously described, the symbol "*z*" is entered into the first stage of shift register 147. Symbol "*b*" is meanwhile shifted into stage 57 and is transferred to the register input stage through AND gate 111 during the next shift operation. The shifting from stage 57 to the input continues until the "0" count signal from register counter 68 resets the blocking circuit 112. At this point, the sequence of symbols stored in the register is as shown in line 9 of FIG. 5.

DELETION

Delete key 19 is activated, supplying a signal to AND gate 160 over line 161. Then register counter 68 next furnishes the "0" count signal on line 67 and 67*a*, AND gate 160 becomes conductive setting blocking means 157. Setting of blocking means 157 causes a signal to appear on line 156 which is transmitted through OR gate 154 and line 114 to one input of AND gate 11. Further, the signal on line 113, via inverter 108 blocks AND gate 105. The register has thus again been increased by one stage. Shifting of the information through the shift register then continues, until at the sixth shifting pulse, the comparator output signal indicates the correspondence between the previously set count on address counter 77 and the count on register counter 68. At this point the comparator output signal resets blocking means 157. At this point the number of stages in the shift register 137 is again decreased, the information in stage 56 being circulated to the input. The symbol *c* which at this point was in stage 57 has thus been deleted from the sequence. Again, as in the previously described embodiments, the number of stages in register counter 68 must of course be adjusted to correspond to the number of stages in register 147.

In the above described embodiments, it is assumed that during "insert" operation the number of stages in the register is temporarily increased and that during the "delete" operation, the number of stages in the register is first increased and then decreased. The system could of course operate equally well if, during the "insert" operation the number of stages is first temporarily decreased and then is again increased and during the "insert" operation the number of stages is temporarily decreased.

As previously mentioned, the information now stored in the shift registers is then typed out solely under control of the typewriter. This operation can of course be repeated as many times as required.

Further, the contents of the shift register storage can also be transferred to other storage means, for example magnetic tape storages. For this purposes, it may be desirable to decrease the frequency of the synchronizing pulses temporarily. The information can of course be retransferred from the magnetic type storage means back into the shift registers. In order to locate the particular information desired to be transferred, it is of course desirable to store some kind of indicating symbol at the beginning of a text. This then allows the text to be located in the other storage to which it has been transferred. The flip-flops required in a preferred embodiment are JK flip-flops such as circuit types SN54L78. For the AND, OR and INVERT-gates circuit types SN54S00, SN54L55, SN54L04 may be used as convenient.

While the invention has been illustrated and described as embodied in specific forms of circulating storage means having temporary increases or decreases of storage stages, it is not to be restricted to these embodiments, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed is new and desired to be protected by Letters Patent is set forth in the appended claims:

1. In a system for furnishing a visual output corresponding to selected ones of a plurality of alphanumeric inputs each represented by a code word having a predetermined number of places, and having function control means for furnishing a selected one of a plurality of function signals including a "write" signal and a "delete" signal upon external activation, a correction arrangement for deleting from said visual output a determined one of said alpha-numeric inputs, comprising, in combination, memory means for storing said code words, said memory means comprising a plurality of synchronously operable circulating storage means, one for each of said places, each having a determined plurality of storage locations arranged in a predetermined order, said plurality of storage locations including a first storage location, a last storage location, a next to the last storage location immediately preceding said last storage location in said predetermined order, and a third last storage location immediately preceding said next to the last storage location in said predetermined order; synchronizing means connected to said memory means, for furnishing synchronizing signals to said plurality of synchronously operable circulating storage means in such a manner that said storage means transfers information from each of said storage locations to the next subsequent one of said storage locations in said predetermined order in response to each of said synchronizing signals; first counting means connected to said synchronizing means for counting said synchronizing signals and furnishing a first counting signal signifying the number of so-counted synchronizing signals; externally operable address signal furnishing means for furnishing address signals each signifying one of said storage locations in said predetermined order; comparator means connected to said address signal and furnishing a comparator output signal when said first counting signal corresponds to said address signal; memory control means connected to said comparator means, said function control means and said memory means for selectively connecting the outputs of said last or next to the last storage locations to said first storage locations under control of said function signals and said comparator output signal in such a manner that said last storage location is disconnected from said first storage location when the code word representing said determined one of said alpha-numeric inputs is in said last storage location, whereby said code word is deleted from the sequence of code words stored in said memory means; and output means connected to said memory means for furnishing said visual output in correspondence to said sequence of code words stored in said memory means.

2. A system as set forth in claim 1, wherein said output means comprise display means having a plurality of display locations corresponding in number to the number of said determined plurality of storage locations in each of said storage means, whereby each of said display locations corresponds to a corresponding one of said storage locations.

3. A system as set forth in claim 2, wherein said output means comprise control means operative in response to said comparator output signal to furnish a visual output corresponding to the code word stored in the storage location signified by said address signal.

4. A system as set forth in claim 3, wherein said correction arrangement is further an arrangement for adding to said visual output a selected one of said alphanumeric inputs; wherein said storage means each comprise a shift register having a plurality of stages each constituting one of said storage locations, said stages including a last stage, a next to the last stage and a third last stage respectively corresponding to said last, next to the last and third last storage locations; wherein said function control signals further include a "isert" signal; and wherein said memory control means comprise first circuit means for connecting the output of said next to the last stage to the input of said first stage in the presence of said "write" signal and under control of said comparator output signal, second circuit means for connecting the output of said last stage to the input of said first stage in the presence of said "insert" signal and under control of said comparator output signal, and third circuit means for connecting the output of said third last stage to the input of said first stage in the presence of said "delete" signal and under control of said comparator output signal.

5. A system as set forth in claim 4, wherein each of said first stages has an input; further comprising input/output control means connected to said inputs of said shift registers.

6. A system as set forth in claim 5, wherein said input/output control means comprise a plurality of input/output control units, one connected to the input of each of said shift registers.

7. A system as set forth in claim 6, wherein said memory control means comprise first OR-gate means having an output connected to said output control means, and a first, second and third input, and blocking circuit means having a blocking circuit output and a first and second blocking circuit input, said blocking circuit means having a set state in response to a signal at said first blocking circuit input and a reset state in response to a signal at said second blocking circuit input, said blocking circuit means furnishing a blocking signal when in said set state; and wherein said first, second and third circuit means respectively comprise first, second and third AND-gate means each having an output connected to a corresponding input of said first OR-gate means, a function control input connected to said function control means in such a manner that said function control input of said first, second and third AND-gate means is enabled, respectively, in response to said "write," "insert" and "delete" signals respectively, a blocking input connected to said blocking circuit output, and a register input connected, respectively, to said next to the last, last, and third last register stages; first inverter means interconnected between said blocking circuit output and said blocking input of said first AND-gate means; first connecting means for connecting said first blocking circuit input to said comparator means; and second connecting means for connecting said second blocking circuit input to said first counting means for resetting said blocking circuit means upon receipt of a "0" count on said first counting means, whereby said memory control means operate to increase or decrease the number of stages in said shift register until completion of the operating cycle having a deletion or insertion.

8. A system as set forth in claim 4, further comprising indicator means connected to said registers, for furnishing an indicator signal signifying the number of empty storage locations.

9. A system as set forth in claim 8, wherein a predetermined code word stored in said storage means signifies an empty storage location; further comprising additional counting means interconnected between said registers and said indicator means, for counting said predetermined code words and furnishing a corresponding counting signal; and wherein said indicator means furnish a visual indication of said counting signal.

10. A system as set forth in claim 9, further comprising additional register means interconnected between said additional counting means and said indicator means, for furnishing the final counting signal in each operating cycle to said indicator means.

11. A system as set forth in claim 4, further comprising additional storage means; and means connected to said additional storage means and said synchronously operable circulating storage means for transferring said sequence of code words from said synchronously operable circulating storage means to said additional storage means.

12. A system as set forth in claim 1, wherein an operating cycle constitutes circulating of one of said code words through all of said storage locations; wherein a "0" count signal on said first counting means signifies the beginning of one of said operating cycles; and wherein said memory control means comprise first memory control means for connecting said next to the last storage location to said first storage location in the presence of said "write" signal, and second memory control means for connecting said last storage location to said first storage location from receipt of said "0" count signal until receipt of said comparator output signal in the presence of said "delete" signal.

13. A system as set forth in claim 12, wherein said connection arrangement further constitutes an arrangement for adding to said visual output a determined one of said alpha-numeric inputs; wherein said function control means further furnish a "insert" signal; and wherein said second memory control means comprise means connected to said function control means, for connecting said last memory location to said first memory location from receipt of said comparator output signal to receipt of said "0" count signal in the presence of said "insert" signal.

14. A system as set forth in claim 13, wherein said memory control means comprise OR-gate means having an output connected to said first storage location, and a first, second and third input, and first and second blocking circuit means, each having a set and reset input and an output carrying a "1" signal upon receipt of a signal at said set input, means for applying said "0" count signal to said reset input of said first blocking means and said set input of said second blocking means; means for applying said comparator output signal to said set input of said first blocking circuit means and said reset input of said second blocking circuit means; wherein said first memory control means comprise first AND-gate means having a first input connected to said next to the last storage location, a second input connected to said function control means for receiving said "write" signal, and a third input connected to said outputs of said first and second blocking means; and wherein said second memory control means comprises second AND-gate means having an output connected to said OR-gate, a first input connected to said last storage location, a second input connected to said function control means for receiving said "delete" and "insert" signals, and a third input; further comprising inverter means connecting said third input of said second AND-gate means to said set outputs of said blocking circuit means.

15. A system as set forth in claim 13, wherein said memory control means comprise OR gate means having an output connected to the input of said first stage, and a first, second and third input, and first and second blocking circuit means, each having a set and reset input and output; means applying said "0" count signal to said reset input of said first blocking means and said set input of said second blocking means; means applying said comparator output signal to said set input of said first blocking circuit means and said reset input of said second blocking circuit means; wherein said first memory control means comprise first AND gate means having a first input connected to said next to the last storage location, a second input connected to receive said "write" signal, and a third input connected to said set outputs of said first and second blocking means; and wherein said second memory control means comprises second AND gate means having an output connected to said OR gate, a first input connected to said last storage location, a second input connected to receive said "delete" and " insert" signals, and a third input; further comprising inverter means connecting said third input of said second AND gate means to said set outputs of said blocking circuit means.

* * * * *